United States Patent [19]

Yamane

[11] Patent Number: 5,347,758

[45] Date of Patent: Sep. 20, 1994

[54] DOOR SEAL DEVICE

[75] Inventor: Tadanao Yamane, Hiroshima, Japan

[73] Assignee: Nishikawa Rubber Co., Ltd., Hiroshima, Japan

[21] Appl. No.: 26,993

[22] Filed: Mar. 5, 1993

[51] Int. Cl.[5] .............................................. E06B 7/16

[52] U.S. Cl. .................. 49/484.1; 49/490.1; 49/495.1

[58] Field of Search ................ 49/490.1, 484.1, 489.1, 49/498.1, 440, 441, 475.1, 495.1, 502

[56] References Cited

U.S. PATENT DOCUMENTS

| | | | |
|---|---|---|---|
| 4,901,476 | 2/1990 | Nagashima et al. | 49/475.1 |
| 5,207,029 | 5/1993 | Nozaki et al. | 49/490.1 X |

*Primary Examiner*—Philip C. Kannan
*Attorney, Agent, or Firm*—Flynn, Thiel, Boutell & Tanis

[57] ABSTRACT

A door seal device capable of being well held by the door frame and of well formed. The door seal device comprises a main frame, a sub-seal engaging with the main frame so as to cover the frame, the sub-seal having a bent portion, a main seal retainer extending aslant from the lower portion of the main fame and having a hook portion and a main seal engaging with the main seal retainer and having a base portion, wherein the bent portion of the sub-seal is first engaged in the recess formed between the hook portion of the main seal retainer and the main seal retainer so that said bent portion is retained by the hook portion and successively the base portion of the main seal is engaged in the recess formed between the bent portion of the sub-seal and the main seal retainer for pressing the bent portion toward the hook portion.

6 Claims, 2 Drawing Sheets

DOOR SEAL DEVICE

BACKGROUND OF THE INVENTION

1. Field of the Invention

The present invention relates to a door seal device comprising a combination of a main seal and a door cutline seal for sealing a space defined between a body opening edge and an upper surface of a door frame.

2. Prior Art

A conventional door seal device will be described with reference to FIG. 1 to 3 The door seal device as illustrated in FIG. 2 comprises a main seal 82 and a subsidiary seal (hereinafter referred to as a sub-seal) 81 which is integrated with the main seal 82. The door seal device as illustrated in FIG. 3 comprises a main seal 93 and a sub-seal 92 which is provided independent of the main seal 93. Denoted at 60 is a glass run and 70 is a garnish. The door seal device as illustrates in FIG. 2 is excellent in that the sub-seal 81 is well held by a door frame 20.

However, this door seal device has such problems that the shape is complex and the formation thereof such as extrusion and molding in the corner thereof is difficult. The door seal device as illustrated in FIG. 3 has no problem in the formation thereof but the sub-seal 92 is not, well held by the door frame 20.

Each of these door seal devices as illustrates in FIGS. 2 and 3 has its merits and demerits as set forth. Accordingly, the conventional door seal device should be improved.

SUMMARY OF THE INVENTION

It is therefore an object of the present invention to provide a door seal device capable of being well held by the door frame and of well formed.

To achieve the above object, the door seal device according to the present invention is characterized in comprising a main frame which is surrounded at three sides thereof except the lower side thereof to thereby form a reversed groove, a sub-seal engaging with the main frame so as to cover the frame, the sub-seal having a substantially S-shaped bent portion at the tip end thereof, a main seal retainer extending aslant from the lower portion of the main frame toward the interior side, the main seal retainer having a hook portion at the outdoor side and a main seal engaging with the main seal retainer and having a base portion, wherein the bent portion of the sub-seal is first engaged in the recess formed between the hook portion of the main seal retainer and the main seal retainer and the base portion of the main seal is successively engaged in the recess formed between the bent portion of the sub-seal and the main seal retainer for pressing the bent portion toward the hook portion.

PREFERRED EMBODIMENT OF THE INVENTION

Figure 1:
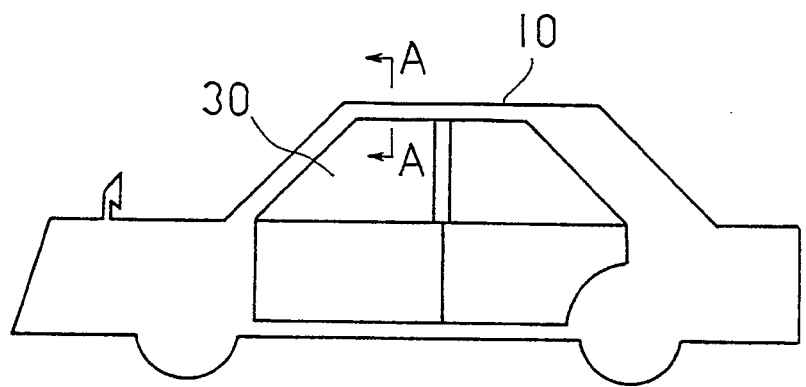
FIG. 1 is a side view of a car.

A door seal device according to the present invention will be described with reference to FIG. 4.

Denoted at 10 is a car body opening edge and 20 is a door frame which is formed by bending a thin steel plate. The door frame 20 comprises a reversed groove or inverted U-shaped main frame 21 which is surrounded at three sides thereof except the lower portion or part or side thereof, a main seal retainer or retaining part 22 which extends aslant from the lower portion of the main frame 21 toward the interior side 18, a glass run retainer or retaining part 23 which extends downward from the lower portion of the main frame 21 and a garnish elastic connecting portion or part 24 which extends between the lower end of main seal retainer 22 and the interior side of the glass run retainer 23. A door glass 30 is engaged in the door flame 20. A sub-seal 40 engages with the main frame 21 so as to cover the main frame 21. The sub-seal 40 has a hooking portion or end 43 at the tip end thereof at the exterior or outdoor side 19, and a substantially S-shaped bent portion or end 42 at the tip end thereof at the interior side 18. The hooking portion 43 of the sub-seal 40 is retained by the lower portion of the outer vertical portion or leg 26 of the main frame 21. The bent portion 42 is retained by or hook-shaped a hook or hooked portion 25 of the main seal retainer 22. A lip 41 protrudes from the upper surface of the sub-seal 40 and elastically contacts the body opening edge 10. A main seal 50 engages with the main seal retainer 22. The main seal 50 comprises a hollow seal portion 52 which elastically contacts the body opening edge 10 and a base portion 51. A glass run seal 60 is engaged in the glass run retainer or retaining part 23 and comprises a base portion 61, a hollow portion 62 for receiving the upper end of the door glass 30 and a lip 63 which elastically contacts the inner surface of the door glass 30. A garnish 70 elastically contacts the garnish elastic connecting portion 24 and it is connected to a trim 71 which is engaged in a flange 11 of the body opening edge 10 at the interior side 18.

An operation of the door seal device according to the present invention will be described hereinafter.

The door seal device is attached to the door frame 20 in the following steps. At first, the sub-seal 40 is allowed to cover the main frame 21 and the hooking portion 43, which is formed at the tip end thereof at the outdoor side 19 is engaged in the lower portion of the outer vertical portion 26 of the main frame 21. Then, the substantially S-shaped bent portion 42, which is formed at the tip end of the sub-seal 40 at the interior side 18, is engaged in the recess formed between the hook portion 25 and the main seal retainer 22 so as to be retained by the hook portion 25 of the main seal retainer 22 at the outdoor side 19. Thereafter, the base portion 51 of the main seal 50 is engaged in the recess formed between the bent portion 42 of the sub-seal 40 and the main seal retainer 22. The bent portion 42 of the sub-seal 40 is retained by the hook portion 25 of the main seal retainer 22 so that the bent portion 42 is pressed by the base portion 51 of the main seal 50 toward the hook portion 25 from the interior side 18 to the outdoor side 19. As a result, the sub-seal 40 can be held reliably and surely at the same holding force as that which is generated in the conventional door seal device as illustrated in FIG. 2, namely, when the sub-seal 81 and the main seal 82 are integrated with each other.

Figure 2:
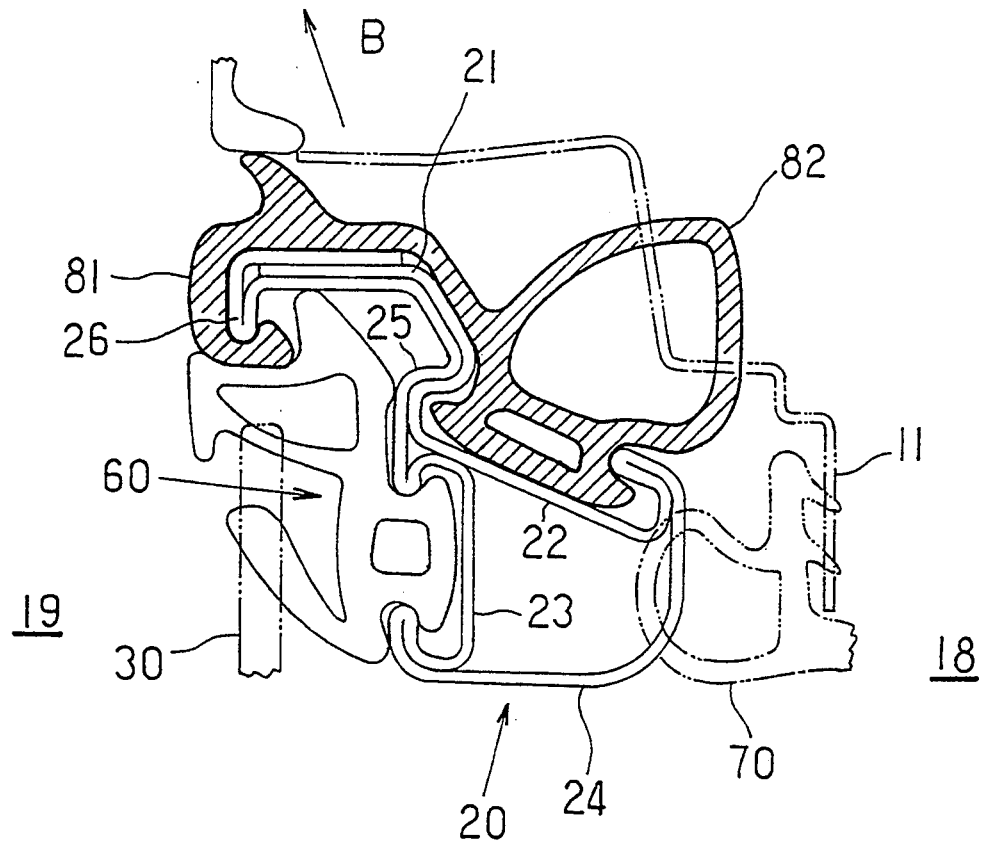
FIG. 2 is a cross-sectional view of a conventional door seal device taken along A—A of FIG. 1.
Figure 3:
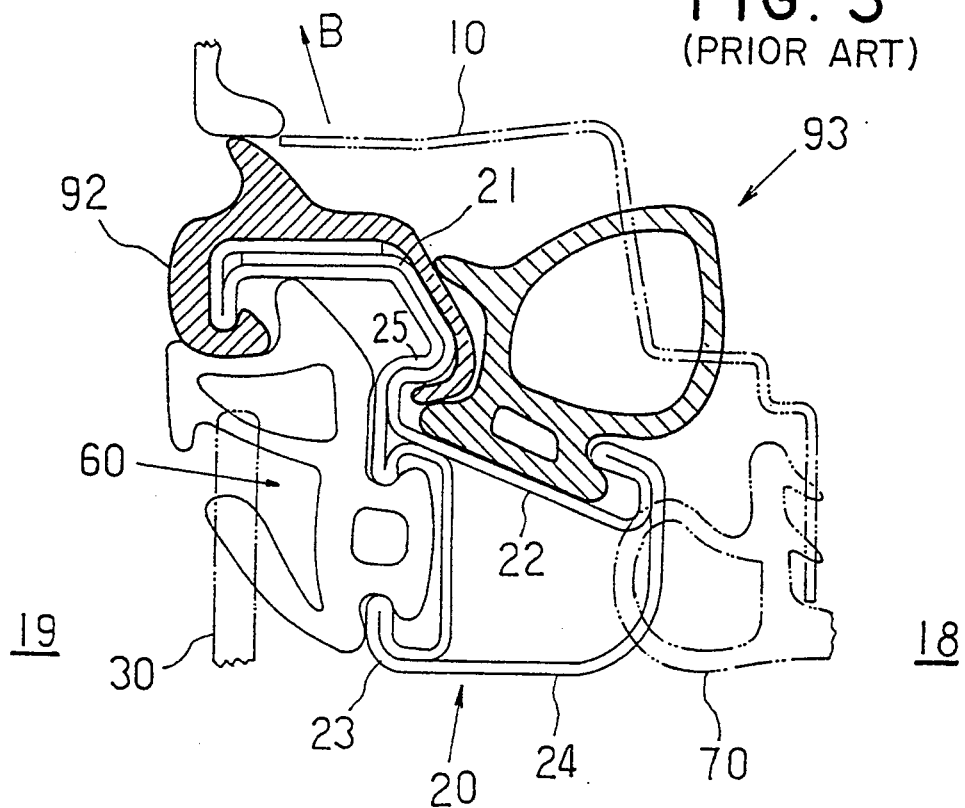
FIG. 3 is a cross-sectional view of another conventional door seal device taken along A—A of FIG. 1.
Figure 4:
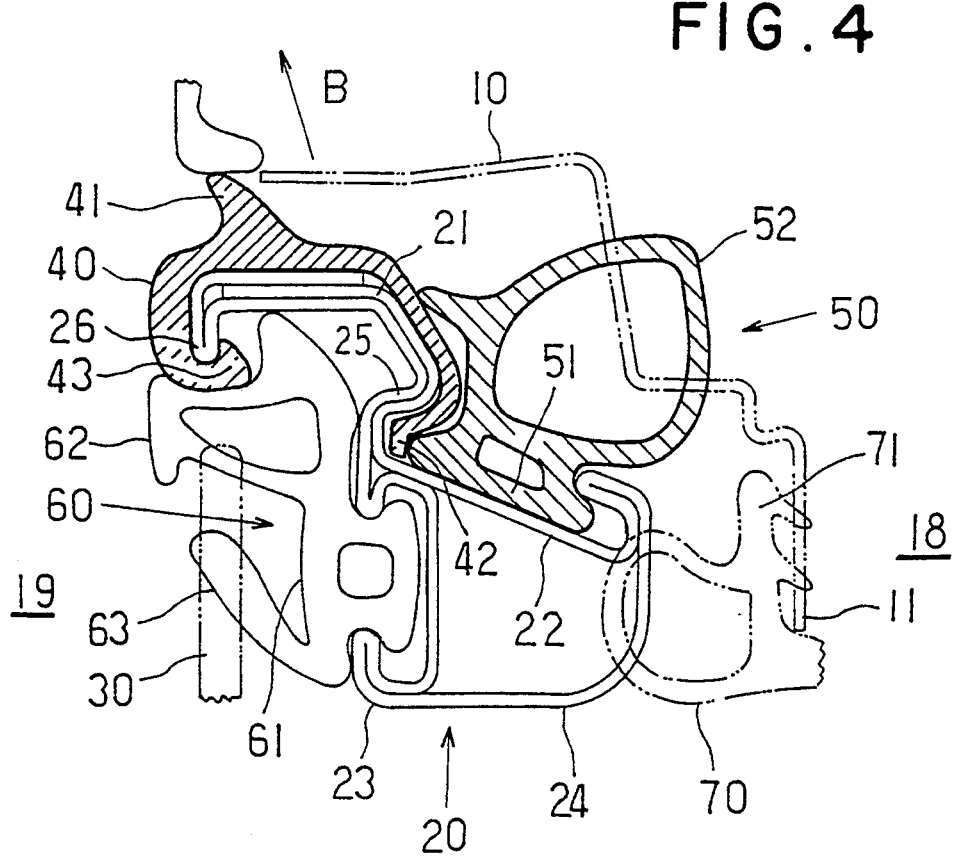
FIG. 4 is a cross-sectional view of a door seal device according to the present invention taken along A—A of FIG. 1.

The sub-seals 81, 92 and 40 of the conventional and the present door seal devices are pulled toward the arrows B as illustrated in FIG. 2, 3 and 4 so as to measure the holding force thereof, i.e. the force for holding the main frame 21. The result of measurement is shown in the attached table wherein dispersion thereof is also measured. The test was made five times and the numerical values in the Table are average ones. The numerical values in the column of 95%, 100% and 105% in the dispersion are those when the size of the sub-seal 40 relative to that of the door frame 20 is 5% less than the standard size, is the same as the standard size and 5% is greater than the standard size.

TABLE

| Type | Dispersion (Kgf) | | |
|---|---|---|---|
| | 95% | 100% | 105% |
| Conventional Sub-seal as shown in FIG. 2 | 4.3 | 3.9 | 3.9 |
| Conventional Sub-seal as shown in FIG. 3 | 1.9 | 1.7 | 0.6 |
| Present Sub-seal as shown in FIG. 4 | 3.8 | 3.6 | 3.6 |

What is claimed is:

1. A device for sealing a car door to a car body comprising:

an inverted groove-shaped door main frame surrounded on three sides thereof except at a lower side thereof;

a sub-seal engagingly covering the main frame, said sub-seal having a substantially S-shaped bent portion at a tip end thereof;

a main seal retainer extending aslant from the lower portion of the main frame toward an interior of the car body, an exterior end of said main seal retainer having a hook portion formed therein; and a main seal engaging with the main seal retainer and having a base portion;

wherein the bent portion of said sub-seal is engaged in a recess formed between the hook portion of the main seal retainer and the main seal retainer so that said bent portion is retained by the hook portion, and the base portion of the main seal is engaged in the recess formed between the bent portion of said sub-seal and the main seal retainer for pressing the best portion toward the hook portion.

2. A device for sealing a car body to a car body comprising:

a door frame including an inverted substantially U-shaped main part having a first leg extending in a first direction along an exterior portion of the door frame and a second leg extending generally in the first direction along an interior portion of the door frame, a main seal retaining part having a first hook-shaped end portion connected to the second leg, a glass run seal retaining part extending in the first direction from the first hook-shaped end portion, and a connecting part connecting a second hook-shaped portion of the main seal retaining part to a free end of the glass run seal retaining part;

a sub-seal substantially conforming with and secured to the main part, the sub-seal having a first end hookingly engaged with and retained by the first leg and a second end hookingly engaged with and retained by the first hook-shaped end portion; and a main seal having a base portion secured to the main seal retaining part, the base portion being retained by at least the first and second hook-shaped end portions, the second end of the sub-seal being positioned between the first hook-shaped end portion and the base portion so that the base portion urges the second end of the sub-seal against the first hook-shaped end portion to further retain the sub-seal.

3. The device as claimed in claim 2, wherein the main seal retaining part extends toward the car body in a second direction transverse to the first direction.

4. The device as claimed in claim 2, wherein the main seal includes hollow portion which resiliently contacts an opening edge of the car body.

5. The device as claimed in claim 4, wherein the sub-seal includes a lip seal extending therefrom which resiliently contacts the opening edge of the car body.

6. The device as claimed in claim 2, wherein the glass run seal retaining part includes third and fourth hook-shaped end portions, and the device further comprises a glass run seal having a second base portion secured to the glass run seal retaining part, the second base portion being retained by at least the third and fourth hook-shaped end portions, the glass run seal also having a hollow portion which contacts the first end of the sub-seal.

* * * * *

UNITED STATES PATENT AND TRADEMARK OFFICE
CERTIFICATE OF CORRECTION

PATENT NO. : 5 347 758
DATED : September 20, 1994
INVENTOR(S) : Tadanao YAMANE

It is certified that error appears in the above-indentified patent and that said Letters Patent is hereby corrected as shown below:

Column 3, line 47; change "best" to ---bent---.

Signed and Sealed this

Fourteenth Day of February, 1995

Attest:

BRUCE LEHMAN

*Attesting Officer*    *Commissioner of Patents and Trademarks*